United States Patent
Yan

(10) Patent No.: US 7,810,315 B2
(45) Date of Patent: Oct. 12, 2010

(54) LNT REGENERATION STRATEGY TO REDUCE NOX SPIKE

(75) Inventor: Jiyang Yan, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 719 days.

(21) Appl. No.: 11/708,550

(22) Filed: Feb. 20, 2007

(65) Prior Publication Data

US 2008/0196397 A1    Aug. 21, 2008

(51) Int. Cl.
*F01N 3/00* (2006.01)

(52) U.S. Cl. .............................. 60/286; 60/274; 60/297; 60/299; 60/301; 60/303; 48/197 R; 48/198.3; 48/198.8

(58) Field of Classification Search ............... 60/274, 60/286, 295, 297, 299, 301, 303; 48/61, 48/197 R, 198.3, 198.7, 198.8
See application file for complete search history.

(56) References Cited

U.S. PATENT DOCUMENTS

| | | | |
|---|---|---|---|
| 5,740,669 A | 4/1998 | Kinugasa et al. | |
| 5,778,667 A | 7/1998 | Kinugasa et al. | |
| 5,974,793 A | 11/1999 | Kinugasa et al. | |
| 6,109,024 A | 8/2000 | Kinugasa et al. | |
| 6,718,756 B1 | 4/2004 | Okada et al. | |
| 6,732,507 B1 | 5/2004 | Stanglmaier et al. | |
| 6,766,642 B2 | 7/2004 | Binder et al. | |
| 6,846,464 B2 | 1/2005 | Montreuil et al. | |
| 6,863,874 B1 | 3/2005 | Twigg | |
| 6,893,997 B2 | 5/2005 | Matsumoto et al. | |
| 6,912,847 B2 | 7/2005 | Deeba | |
| 6,932,067 B2 | 8/2005 | Takaya et al. | |
| 6,959,542 B2 * | 11/2005 | Taylor et al. | 60/295 |
| 6,973,776 B2 | 12/2005 | van Nieuwstadt et al. | |
| 7,082,753 B2 * | 8/2006 | Dalla Betta et al. | 60/286 |
| 7,093,428 B2 * | 8/2006 | LaBarge et al. | 60/286 |
| 7,101,531 B2 * | 9/2006 | Kamijo | 423/650 |
| 7,117,669 B2 | 10/2006 | Kaboord et al. | |
| 7,165,393 B2 * | 1/2007 | Betta et al. | 60/286 |
| 7,386,977 B2 * | 6/2008 | Ancimer et al. | 60/286 |
| 2003/0101713 A1 | 6/2003 | Dalla Betta et al. | |
| 2004/0076565 A1 | 4/2004 | Gandhi et al. | |
| 2006/0010857 A1 | 1/2006 | Hu et al. | |

FOREIGN PATENT DOCUMENTS

WO    WO 2005/049984 A1    6/2005

* cited by examiner

*Primary Examiner*—Binh Q Tran
(74) *Attorney, Agent, or Firm*—Paul V. Keller

(57) ABSTRACT

Systems and methods are disclosed for ameliorating NOx slip from a lean NOx trap by reducing the amount of hydrocarbons reaching the lean NOx trap during the early stages of, or in a period immediately preceding, a rich regeneration. In one embodiment, a hydrocarbon absorber is configured downstream from a fuel reformer, but upstream from the lean NOx trap, in order to reduce the quantity of hydrocarbons that reach the lean NOx trap during lean reformer warm-up and rich regeneration phases. In another embodiment, the fueling rate to a fuel reformer configured in an exhaust line upstream from the lean NOx trap is limited to reduce NOx slip.

15 Claims, 2 Drawing Sheets

LNT REGENERATION STRATEGY TO REDUCE NOX SPIKE

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR) catalysts, and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean NOx reduction, introducing a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometimes ambiguous nomenclature, one should note that in the exhaust aftertreatment art the terms "SCR catalyst" and "lean NOx catalyst" can be used interchangeably. Often, however, the term "SCR" is used to refer just to ammonia-SCR, in spite of the fact that strictly speaking ammonia-SCR is only one type of SCR/lean NOx catalysis. Commonly, when both ammonia-SCR catalysts and lean NOx catalysts are discussed in one reference, SCR is used in reference to ammonia-SCR and lean NOx catalysis is used in reference to SCR with reductants other than ammonia, such as SCR with hydrocarbons.

LNTs are devices that adsorb NOx under lean exhaust conditions and reduce and release the adsorbed NOx under rich conditions. An LNT generally includes a NOx adsorbent and a catalyst. The adsorbent is typically an alkaline earth compound, such as $BaCO_3$ and the catalyst is typically a combination of precious metals including Pt and Rh. In lean exhaust, the catalyst speeds oxidizing reactions that lead to NOx adsorption. In a reducing environment, the catalyst activates reactions by which hydrocarbon reductants are converted to more active species, the water-gas shift reaction, which produces more active hydrogen from less active CO, and reactions by which adsorbed NOx is reduced and desorbed. In a typical operating protocol, a reducing environment will be created within the exhaust from time-to-time to regenerate (denitrate) the LNT.

An LNT can produce ammonia during denitration. Accordingly, it has been proposed to combine LNT and ammonia-SCR catalysts into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate.

An SCR catalyst can be used to address the problem of ammonia release from the LNT during regeneration, but there is another issue in that some NOx is released without being reduced. The release occurs primarily at the beginning of LNT regeneration. The resulting sharp and transient increase in exhaust NOx concentration is often referred to as an NOx release spike. Several theories have been proffered to explain this release spike. These theories have led to diverse proposals for potential solutions.

U.S. Pat. Pub. No. 2004/0076565 proposes that the NOx spike results from a sudden increase in LNT temperature due to reaction of reductant with oxygen stored in the LNT. The proposed solution is to reduce the oxygen storage capacity of the LNT.

WO 2005/049984 proposes that the NOx spike results from violent reactions between oxygen-containing exhaust gases and reductant rich exhaust gases mixing within the interstices of the LNT at the beginning of the regeneration. The proposed solution is a near stoichiometric phase in between rich and lean phases. Oxygen carrying exhaust gas is to be flushed from the LNT during the near stoichiometric phase by an exhaust gas that contains little or no reductant.

U.S. Pat. No. 5,740,669 proposes that the NOx spike results from the exhaust conditions occurring within the LNT during the transition period between lean and rich phases. During the transition period, the exhaust is though to be sufficiently rich to cause NOx to release, but not sufficiency rich to reduce all the released NOx. The proposed solution is to regenerate the LNT only when the LNT is below a predetermined temperature, whereby NOx is not so readily released.

U.S. Pat. No. 5,778,667 suggests that the NOx spike results from an imbalance between the rate of release of NOx and the availability of HC and CO reductants. The proposed solution is to introduce ammonia, which is used to reduce the released NOx downstream from the NOx absorber.

U.S. Pat. No. 6,718,756 suggests that the NOx spike is caused by CO in the exhaust, which both releases NOx and reduces NOx, but at rates that do not match. It is said that increasing the CO supply rate will not ameliorate the spike, because CO increases the release rate as well as the reduction rate. The proposed solution is to supply a reductant that does not cause NOx release. The preferred reductant is fuel, which can be supplied to the exhaust by injection into engine cylinders during exhaust strokes.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S.

Environmental Protection Agency (EPA) regulations effective in 2010 and other such regulations

SUMMARY

This disclosure relates to limiting the release of unreduced NOx from an LNT. The inventor has obtained data showing that the NOx release spike is associated with hydrocarbon reductants contacting the LNT immediately prior to or during the early stages of LNT regeneration. The data includes evidence for NOx release even under lean conditions when significant amounts of hydrocarbons reach the LNT. This can happen, for example, when hydrocarbons used to heat a fuel reformer upstream from an LNT slip past the fuel reformer to the LNT.

One of the inventor's concepts is to position a hydrocarbon absorber upstream from an LNT to limit the amount of hydrocarbon that reaches the LNT while the LNT is at relatively low temperatures. In one embodiment, the hydrocarbon absorber stores the hydrocarbons until it and the LNT have heated, whereupon the hydrocarbons desorb. In another embodiment, the hydrocarbon absorber stores the hydrocarbons until they are oxidized.

One power generation system based on this concept comprises a diesel engine, an exhaust line configured to receive exhaust from the diesel engine, a lean NOx trap configured within the exhaust line, a fuel reformer configured to supply syn gas for regenerating the lean NOx trap, and a hydrocarbon absorber configured within the exhaust line upstream from the LNT, but downstream from the fuel reformer. The system configuration requires the syn gas to pass through the hydrocarbon absorber in order to reach the LNT.

One method of operating a power generation system based on this concept comprises operating a diesel engine to produce an exhaust comprising NOx, passing the exhaust from the engine to an LNT through a fuel reformer, adsorbing NOx from the exhaust under lean conditions using the LNT, and preparing to regenerate the LNT by injecting diesel fuel into the exhaust. The injected fuel combusts in the fuel reformer under lean conditions to heat the fuel reformer. As the fuel reformer heats, hydrocarbons slipping past the fuel reformer are trapped in a hydrocarbon absorber downstream from the fuel reformer, but upstream from the LNT. The exemplary method further involves regenerating the LNT by increasing the fuel injection rate to form syn gas under rich conditions within the fuel reformer. In a related method, the hydrocarbons are absorbed during at least the first part of the rich phase, with absorption during the lean warm-up phase being optional. In particular embodiments of these methods, some absorption is likely to occur during the lean warm-up phase and some during the rich regeneration phase.

Another of the inventors concepts is to limit the amount of hydrocarbon that slips to the LNT by suitably limiting the fueling rate of a fuel reformer that supplies syn gas to the LNT. In one embodiment, the fueling rate is limited during a lean reformer warm-up phase. In another embodiment, the fueling rate is limited during the early stages of a rich regeneration phase. Preferably, the limitations to fueling rate are functions of LNT temperature, as the LNT's ability to process hydrocarbons will increase with increasing LNT temperature. Optionally, the fueling rates are regulated using feedback from an approximation of either NOx slip rate from the LNT or hydrocarbon slip rate from the fuel reformer. An approximation can be obtained from a model-based estimate.

One method of operating a power generation system based on this concept comprises operating a diesel engine to produce exhaust comprising NOx, passing at least a portion of the exhaust from the engine to an LNT through a fuel reformer, adsorbing NOx from the exhaust under lean conditions using the LNT, preparing to regenerate the LNT by heating the fuel reformer by at least 100° C. to a temperature of at least about 500° C. by injecting fuel at rates that leave the exhaust entering the fuel reformer lean, and then injecting fuel at rates that leave the exhaust entering the fuel reformer rich, whereby the fuel reformer produces syn gas that regenerates the LNT. The fuel injection rate during the lean warm-up phase is limited to limit the amount of hydrocarbon that slips from the fuel reformer during that phase. Optionally, the fuel injection rate is also limited during a first part of the rich regeneration phase to limit the amount of hydrocarbon that slips from the fuel reformer during that period.

Another method of operating a power generation system based on this concept comprises operating a diesel engine to produce exhaust comprising NOx, passing at least a portion of the exhaust from the engine to an LNT through a fuel reformer, adsorbing NOx from the exhaust under lean conditions using the LNT, and then injecting fuel at rates that leave the exhaust entering the fuel reformer rich, whereby the fuel reformer produces syn gas that regenerated the LNT. The fuel injection rate is limited during at least an initial portion of the regeneration phase to limit the amount of hydrocarbon that slips from the fuel reformer. Hydrocarbon absorption can be used in conjunction with limiting fuel injection rates to mitigate hydrocarbon slip to the LNT.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claims as his invention being reserved for the claims that follow.

DETAILED DESCRIPTION

Figure 1:
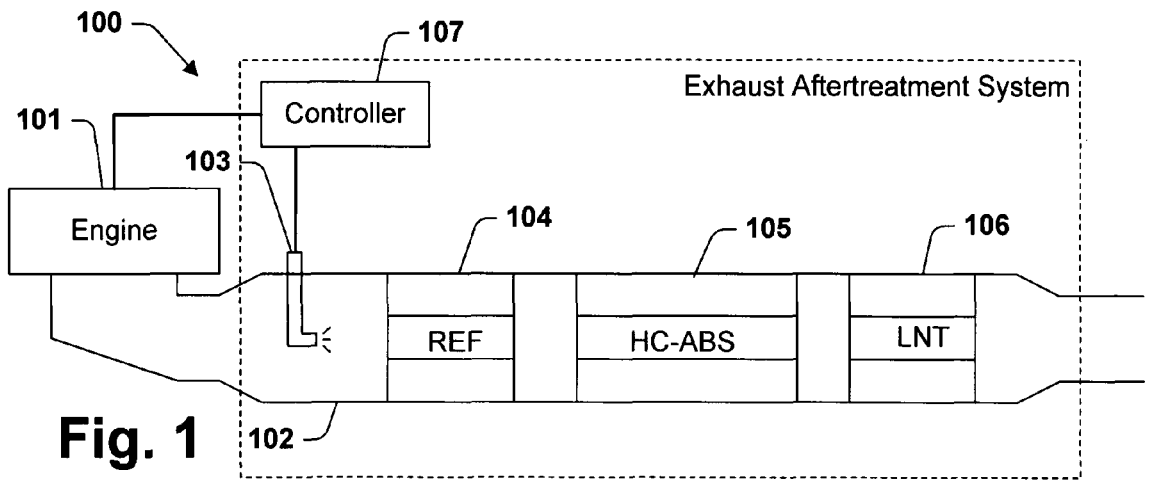
FIG. 1 is schematic illustration of an exemplary power generation system configured to mitigate NOx spike by hydrocarbon absorption.

The power generation system 100 schematically illustrated by FIG. 1 is one example of a power generation configured to mitigate NOx slip during LNT regeneration via hydrocarbon absorption. The system 100 comprises an engine 101, an exhaust line 102, and a controller 107. Within the exhaust line 102 are configured a fuel reformer 104, a hydrocarbon absorber 105, and a LNT 106 in that order respectively with respect to the direction of exhaust flow from the engine 101. The controller 107 is operative to selectively control injection of fuel into the exhaust line 102 through the fuel injector 103.

The controller 107 may be an engine control unit (ECU) for the engine 101 or a separate control unit. Generally the fuel injector 103 injects the same fuel used to power the engine 101. Generally this fuel is a diesel fuel and the engine 101 is a compression ignition engine, although the invention is applicable to systems using other types of fuels and engines. The diesel fuel can be any type of hydrocarbon-based fuel suitable for a compression ignition engine.

The engine 101 is operational to produce lean exhaust-comprising NOx. The LNT 106 is functional to absorb a substantial portion of the NOx from this exhaust during normal operation of the system 100 (a lean phase). During normal operation of the system 100, the exhaust generally contains from about 4 to about 20% oxygen. In the system 100, the exhaust flow path is static. All the exhaust reaching the LNT 106 first passes through the fuel reformer 104, regardless of whether the LNT 106 is undergoing regeneration.

From time-to-time, the LNT 106 must be regenerated to remove accumulated NOx (denitrated) in a rich phase. Denitration generally involves heating the reformer 104 to an operational temperature and then using the reformer 104 to produce reformate. The reformer is generally heated by injecting fuel into the exhaust upstream from the fuel reformer 104 at a sub-stoichiometric rate, whereby the exhaust remains lean and most of the injected fuel completely combusts in the reformer 104. This may be referred to as a lean warm-up phase. Once combustion has heated the reformer 104, the fuel injection rate can be increased to make the exhaust rich, whereupon the reformer 104 consumes most of the oxygen from the exhaust and produces reformate by partial oxidation and steam reforming reactions. The reformate thus produced reduces NOx adsorbed in the LNT 106.

It is generally desirable to make the lean warm-up phase as short as possible. The engine 101 is generally a diesel engine comprising a turbocharger, and the fuel reformer 104 is generally configured downstream from the turbocharger. The exhaust temperatures at this point are in the range from about 110 to about 550° C. Commonly, the exhaust temperatures are in the lower part of this range. As the fuel reformer is heated to its minimum operational temperature, which is typically from about 500 to about 600° C., the exhaust passing through the reformer 104 is heated to approximately the reformer temperature. Thus, the longer the heating phase, the more exhaust must be heated, and the greater the fuel cost of heating the fuel reformer 104.

A rapid warm-up is also desirable in terms of providing a quick response to a signal to regenerate the LNT 106. Quicker responses facilitate optimization of LNT regeneration scheduling. Quicker responses also facilitate taking advantage of conditions conducive to LNT regeneration, which conditions may be transient and occur somewhat unpredictably. The heating rate can generally be increased by increase fuel injection rate, at least up to the point that injected fuel makes up a stoichiometric amount for complete combustion with the oxygen contained in the exhaust While increasing the fuel injection rate increases the heating rate of the fuel reformer 104, fuel slips from the fuel reformer 104 during heating and the amount of injected fuel that slips also fuel generally increases with increasing fuel injection rate. Fuel slips due to various factors, such as inefficiencies in mixing, limited mass transfer rates, and limited catalyst activity. A certain amount of injected fuel slips past the fuel reformer 104 even when the fueling rate is well below stoichiometric. If this hydrocarbon reaches the LNT 106, it can caused unreduced NOx to be released immediately preceding LNT regeneration In certain respects, it is also desirable to maximize the fuel injection rate during the rich regeneration phase. Over the course of regeneration, fuel must be consumed to remove excess oxygen from the exhaust. While some of the energy produced by this combustion drives steam reforming reactions, the efficiency is limited. As a result, the fuel penalty for regeneration decreases up to a point as the fuel injection rate, and consequently the regeneration rate, increases. When the fuel injection rate is set to minimize fuel penalty for regeneration, some hydrocarbon slips from the fuel reformer 104. If this hydrocarbon reaches the LNT 106, it can caused unreduced NOx to be released, particularly at the beginning of LNT regeneration.

In the system 100, most of the fuel slipping during the lean warm-up and rich regeneration phases is absorbed and stored by the hydrocarbon absorber 105. Absorbing fuel in this manner substantially reduces the amount of fuel that slips to the LNT 106 during the lean warm-up and rich regeneration phases. The efficiency of the hydrocarbon absorber 105 is generally greater at lower temperatures, which is convenient in that the tendency of hydrocarbons to cause unreduced NOx release from the LNT 106 is higher at lower temperatures. Accordingly, the hydrocarbon absorber 105 substantially reduces NOx slip rates from the LNT 106 and permits the fuel reformer 104 to be heated faster and the LNT 106 to be regenerated faster while keeping NOx slip from the LNT 106 within an acceptable range.

Any suitable mechanism can be used to remove stored hydrocarbon from the hydrocarbon absorber 105 in order to restore its absorption capacity. One possible mechanism is temperature swing adsorption. Over the course of regeneration, the hydrocarbon absorber 105 may become heated through the action of the fuel reformer 104. If the hydrocarbon absorber 105 is saturated with absorbed hydrocarbons, the hydrocarbon absorber 105 will release some hydrocarbon as it is heated. This should not occur until the LNT 106 is at least partially regenerated. Preferably, it does not occur until the LNT 106 has also heated significantly. Both reducing the amount of stored NOx in the LNT 106 and heating the LNT 106 reduce the tendency of the LNT 106 to release NOx upon exposure to hydrocarbons.

The hydrocarbon absorber 105 can also release stored hydrocarbons without heating. When the hydrocarbon absorber 105 is saturated with hydrocarbons, an equilibrium exists between the exhaust hydrocarbon concentration and the activity of the hydrocarbons absorbed on the LNT 106. When the hydrocarbon concentration in the exhaust is reduced, hydrocarbons will begin to desorb. Preferably, most of this desorption occurs during the subsequent lean phase. Hydrocarbons desorbed from the hydrocarbon absorber 105 during a lean phase will generally be oxidized over the LNT 106.

Another mechanism of removing stored hydrocarbons to which the system 100 can be adapted is oxidation. Stored hydrocarbons can be oxidized by providing the hydrocarbon absorber 105 with an oxidation catalyst. In a lean phase following a rich phase regeneration phase, adsorbed hydrocarbons can be oxidized using oxygen contained in the exhaust. Examples of suitable oxidation catalyst include precious metals, such as Pt and Pd. If the hydrocarbon absorber 105 is provided with an oxidation catalyst, preferably the hydrocarbon absorber 105 has little or no oxygen storage capacity so that excessive amounts of reductant intended for the LNT 106 are not consumed over the hydrocarbon absorber 105.

The engine 101 is generally a medium or heavy duty diesel engine. The inventor's concepts are applicable to light duty diesel and lean burn gasoline power generation systems, but the problem addressed by the inventor does not occur as often or to as great an extent in these systems. Minimum exhaust temperatures from lean burn gasoline engines are generally higher than minimum exhaust temperatures from light duty diesel engines, which are generally higher than minimum exhaust temperatures from medium duty diesel engines, which are generally higher than minimum exhaust temperatures from heavy duty diesel engines. Lower exhaust temperatures lead to lower LNT temperatures. LNTs are more prone to release NOx on exposure to hydrocarbons at lower temperatures as compared to high temperatures. A medium duty diesel engine is one with a displacement of at least about 4 liters, typically about 7 liters. A heavy duty diesel engine is one with a displacement of at least about 10 liters, typically from about 12 to about 15 liters.

The exhaust line 102 is provided with an exhaust line fuel injector 103 to create rich conditions for LNT regeneration. The inventor's concepts are applicable to other method's of creating a reducing environment for regenerating the LNT 106, but NOx spike due to hydrocarbon slip is more of an issue when hydrocarbons are injected directly into the exhaust line 102. For example, NOx slip is less likely to occur when diesel fuel is injected into the exhaust within the engine cylinders, whereby high temperatures within the cylinders can decompose the diesel fuel. NOx slip is also less likely to occur if lighter reductants, such as propane, are injected into the exhaust line instead of diesel fuel. Nevertheless, it is preferred that the reductant is the same as the fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

The exhaust line 102 is preferably configured without exhaust valves or dampers. In particular, the exhaust line 102 is preferably configured without valves or dampers that could be used to vary the distribution of exhaust among a plurality of LNTs 104. The inventor's concepts are applicable to aftertreatment systems with exhaust valves or dampers, but hydrocarbon slip and resulting NOx release is more easily avoided when exhaust valves or dampers are used. By using exhaust valves or dampers to reduce the exhaust flow to a fuel processor 102, the residence time can be increased. Increasing the residence time allows a greater extent of reaction to be achieved for a given catalyst loading, which would reduce hydrocarbon slip. Nevertheless, it is preferred that the exhaust line 102 be configured without valves or dampers because these moving parts are subject to failure and can significantly decrease the durability and reliability of an exhaust aftertreatment system.

Even when the exhaust line 102 is free from exhaust valves or dampers, an exhaust line upstream of the exhaust line 102 may still contain an exhaust valve, such as an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The fuel reformer 104 preferably comprises an effective amount of catalyst to catalyze steam reforming reactions at 600° C. Rh in particular, when provided in sufficient amounts in a suitable wash coat formulation, can be effective to catalyze steam reforming at temperatures from about 500 to about 700° C. In a typical formulation for the fuel reformer 104, Rh is combined with at least one other precious metal, such as Pt or Pd.

Preferably the fuel reformer 104 is designed to have a low thermal mass, whereby at least a part of the fuel reformer 104 can be easily heated to steam reforming temperatures for each regeneration of the LNT 106. Low thermal mass is typically achieved by constructing the fuel reformer 104 using a thin metal substrate. A thin metal substrate has a thickness that is about 100 μm or less, preferably about 50 μm or less, and still more preferably about 25 μm or less.

A small size also facilitate rapid heating. Preferably, the total supported catalyst volume of fuel reformer 104 is only about 60% of the engine displacement or less, more preferably about 50% of the engine displacement or less. If the fuel reformer 104 is in an exhaust branch processing only a partial exhaust stream, the preferred size would be reduced in proportion to the fraction of the exhaust being treated.

Steam reforming temperatures are at least about 500° C., which is generally above the exhaust temperature. The fuel reformer 104 can be configured to be heated by any suitable means, but preferably the fuel reformer 104 can be warmed up and operated using diesel fuel from the injector 103. Preferably, the fuel reformer 104 can be heated in this manner stating from an initial temperature of 275° C. while the exhaust from the engine 101 remains at 275° C. More preferably, the fuel reformer 104 can be heated in this manner and operated from initial exhaust and reformer temperatures of 225° C., and still more preferably from exhaust and reformer temperatures of 175° C. These properties can be achieved by providing the fuel reformer 104 with effective amounts of precious metals, such as Pt and/or Pd, for catalyzing oxidation of diesel fuel at the starting temperatures.

Having the fuel reformer 104 operate at steam reforming temperatures reduces the total amount of precious metal catalyst required by the exhaust aftertreatment system 100. Less precious metal catalyst is required when reforming at steam reforming temperatures as compared to reforming diesel fuel at exhaust temperatures regardless of whether reforming is through partial oxidation and stream reforming or exclusively though partial oxidation reactions.

Having the fuel processors operate at least partially through steam reforming reactions significantly increases the reformate yield and reduces the amount of heat generation. In principal, if reformate production proceeds through partial oxidation reforming as in the reaction:

$$CH_{1.85} + 0.5O_2 \rightarrow CO + 0.925H_2 \tag{1}$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \tag{2}$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust. Preferably, the fuel reformer 104 comprises enough steam reforming catalyst that at 600° C., with an 8 mol % exhaust oxygen concentration from the engine 101 and with sufficient diesel fuel to provide the exhaust with an overall fuel to air to fuel ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel sold in the United States, which is a typical diesel fuel. The overall fuel to air ratio is calculated on the basis of fuel injected by the engine and fuel injected into the exhaust line 103. Preferably, the fuel reformer 104 operates nearly auto-thermally during LNT regeneration. Nearly auto-thermal operation means the fuel reformer 104 heats at half or less the rate it would if it operated entirely by partial oxidation reforming, more preferably one quarter or less.

The inventor's concepts are also applicable to systems having exhaust line fuel reformers that operate at exhaust line temperatures essentially without steam reforming. Hydrocarbon slip and NOx release may be even a greater problem in such systems due to lower conversion rates unless a very large amount of catalyst is used. The principle difference is that such a system generally does not use a lean warm-up phase, thus hydrocarbon slip mitigation is generally entirely during the rich regeneration phase, primarily at the beginning of that phase.

Each of the fuel reformer 104, the hydrocarbon absorber 105, and the LNT 106 is required to have a sufficiently large mass transfer coefficient while not introducing excessive back pressure that could adversely affect the engine 101. Generally this means that size of each of these devices is at least about 0.5 times the displacement of the engine 101. Typical sizes are from about 1.0 to about 2.0 times the engine displacement 101. Each of these device can be provided in one or more bricks. Multiple catalyst bricks can be configured in series or in parallel with respect to the exhaust flow. Parallel bricks can be provided in separate parallel exhaust conduits. Preferably, at least the bulk of the exhaust from the engine 101 passes through the fuel reformer 104, the hydrocarbon absorber 105, and the LNT 106.

The catalyst bricks of which the fuel reformer 104, the hydrocarbon absorber 105, and the LNT 106 are comprised can have any suitable structures and composition. Preferred structures are monoliths. The substrates can be, for example, metal, ceramic, or silicon carbide.

If the system 100 is designed for temperature swing desorption of adsorbed hydrocarbons from the hydrocarbon absorber 105, hydrocarbon absorber 105 is preferably constructed with an appropriate thermal mass. If the heat release from the fuel reformer 104 is relatively low during rich regeneration, a hydrocarbon absorber may suitably be constructed using thin metal walls. If the heat release from the fuel reformer 104 is relatively large during rich regeneration, a ceramic substrate may be more suitable. The hydrocarbon absorber 105 may also serve as a thermal buffer between the fuel reformer 104 and the LNT 106, preventing excessive temperature increases with the LNT 106 during each rich regeneration. Optionally, the hydrocarbon absorbent is only coated on the upstream portion of such a thermal buffer, which can be advantageous in that the upstream portion may undergo larger temperature swings than the downstream portion.

If the system 100 is designed for temperature swing adsorption and desorption of hydrocarbons from the hydrocarbon absorber 105, the system is preferably designed for the temperature of the hydrocarbon absorber 105 to increase by about 50 to about 300° C. over the course of a typical regeneration of the LNT 106 from a starting temperature in the range from about 250 to about 300° C. More preferably, the system 100 is designed for the hydrocarbon absorber 104 to increase from about 100 to about 200° C. over the course of the rich regeneration. A temperature difference of this magnitude can effectively restore the absorption capacity of a suitable constructed hydrocarbon absorber 104.

The hydrocarbon absorber 105 can operate through any suitable hydrocarbon absorption mechanism. Suitable hydrocarbon absorption mechanisms include capillary condensation, hydrogen bonding, and Lewis acid interaction. These are all relatively low activation energy mechanisms, whereby absorption can be easily reversed. Any suitable material can be used as a hydrocarbon absorbent. Hydrocarbon absorbents can be found, for example, among zeolites.

The hydrocarbon absorber 105 preferably functions under at least some lean fuel reformer warm-up conditions to adsorb at least about 25% of the exhaust line injected hydrocarbons having more than three carbon atoms and slipping past the fuel reformer 104 with the LNT at a temperature of 275° C., more preferably at least about 50%, and still more preferably at least about 70%.

Preferably the hydrocarbon absorber 105 has the capacity to absorb at 275° C. an amount of hydrocarbons that is enough to heat the fuel reformer 104 by about 10° C., optionally an amount that is at least enough to heat the fuel reformer 104 by about 30° C., and optionally an amount that is at least enough to heat the fuel reformer 104 by about 50° C.

On the other hand, the capacity, size, and cost of the hydrocarbon absorber 105 can be limited to the capacity to absorb at 275° C. an amount of hydrocarbons that is no more that enough to heat the fuel reformer 104 by about 200° C., optionally limited to an amount that is no more than enough to heat the fuel reformer 104 by about 100° C., and optionally limited to an amount that is no more than enough to heat the fuel reformer 104 by about 50° C.

The other approach to mitigating NOx spike, which can be used in conjunction with or separately from the hydrocarbon absorber described above, is to limit the amount of HC that slips from the fuel reformer 104 by limiting the fueling rate of the fuel reformer 104. This concept can comprise limiting the fuel injection rate during a lean warm-up phase and/or limiting the fuel injection rate during the early stages of a rich regeneration phase.

Figure 2:
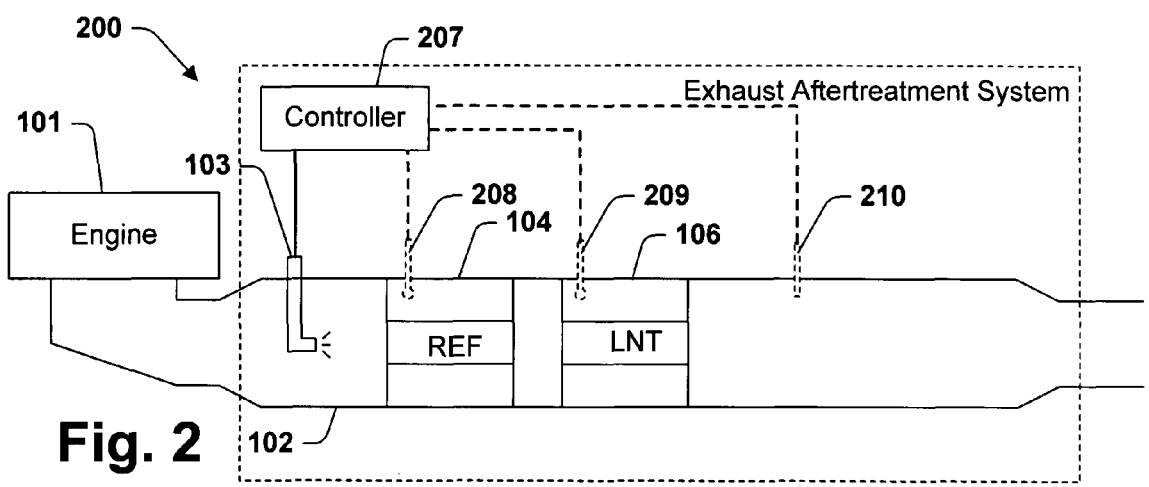
FIG. 2 is schematic illustration of an exemplary power generation system configured to mitigate NOx spike by limiting hydrocarbon slip from a fuel reformer.

FIG. 2 provides a schematic illustration of an exemplary power generation system 200 in which the inventor's concept of limiting fuel injection rates to limit NOx slip can be implemented. The power generation system 200 includes some of the same components as the system 100 including the engine 101, the exhaust line 102, the fuel injector 103, the fuel reformer 104, and the LNT 106. The power generation system 200 also includes a controller 207 configured to limit the fuel injection rate through the fuel injector 103 based on the inventors concepts. The system 200 may also include a thermocouple 208 for measuring a temperature of the fuel reformer 104, a thermocouple 209 for measuring a temperature of the LNT 106, and a NOx sensor 210 for detecting NOx slipping from the LNT 106. Each of the thermocouples and sensor 210 is optional and each can optionally be used to provide feedback to the controller 207.

The controller 207 can limit the fuel injection rate in any suitable fashion. Options include feedback and feed forward control. Feed back control can be based on NOx slip rate, wherein fueling rates are reduced in response to NOx slip rate from the LNT 106 increasing beyond a set limit. A set limit on NOx slip rate could be a not-to-exceed limit set by government regulation or a customer-determined limit. Feed back control can also be based on hydrocarbon slip rates, wherein fueling rates are reduced in response to HC slip rate from the fuel reformer 104 increasing beyond a set limit. A set limit could be, for example, about 5% or the injected amount, about 1000 ppm, the particular hydrocarbon slip rate limit optionally being temperature dependent. HC slip rates are generally not measured outside of experimental set-ups. In practice, HC slip rates for feedback control can be model based estimates. A typical model would be of the fuel reformer 104 and would include as inputs exhaust conditions, which can be related to the engine speed-load point, and a temperature reading from the thermocouple 208.

Optionally, limits on fueling rates can be established in advance based on test system measurements of HC or NOx slip rates. Limits determined in advance can be used to set target fueling rates correlated to one or more system variables. Examples of suitable variables to consider include variables relating to exhaust flow rate, exhaust oxygen concentration, a temperature of the fuel reformer 104, and a temperature of the LNT 106. These limits can be used to set fueling rates or fueling rate targets.

Regardless of how the fuel injection rate is controlled, when limiting the fuel injection rate to mitigate NOx slip, the amount of hydrocarbon slipping from the fuel reformer 104 is preferably made less at low temperatures. At higher temperatures, more hydrocarbon slip is permissible in that the LNT 106 is able to more effectively use hydrocarbons to reduce NOx. In general, it is desirable to maximize fuel injection rates during lean reformer warm-up and rich syn gas production subject to certain limits. When the limit is related to mitigating unreduced NOx release from the LNT 106, the amount of slip allowed is preferably permitted to increase with increasing temperature of the LNT 106 and preferably required to be less as the temperature of the LNT 106 becomes less. The hydrocarbon slip can be made less in terms of concentration or flow rate.

Fuel injection rates may be limited during a lean warm-up phase to avoid excessive thermal stress during heating of the fuel reformer 104, but the fueling rates may be limited to an even greater extent to implement the inventor's concepts. For example, the fuel injection rate might be limited to about 100° C./s or less to prevent damage to the fuel reformer 104. According the inventor's concept, however, the fuel injection rate might limit the fuel reformer heating rate to about 50° C./s or less, about 20° C./s or less, or even to about 10° C./s or less.

Fuel injection rates during a rich regeneration phase might be limited based on the amount of fuel the fuel reformer 104 can effectively process, but the fueling rates may be limited to an even greater extent to implement the inventor's concepts. For example, US 2004/0050037 describes operating an exhaust line fuel reformer to produce an exhaust containing only about 4% syn gas during LNT regeneration. According to the present concept, fueling rates may be so limited that syn gas concentrations are only about 3% or less, ore even about 2% or less, at least during the early stages of an LNT regeneration.

An LNT is a device that adsorbs NOx under lean exhaust conditions and reduces and releases NOx under rich exhaust conditions. An LNT as defined herein comprises a $NO_X$ adsorbent and a precious metal catalyst in intimate contact on the surfaces of a porous support. The support is typically a monolith, although other support structures can be used. The monolith support is typically ceramic, although other materials such as metal and SiC are also suitable for LNT supports. The supported catalyst volume of the LNT 104 is typically from about one to about four times the displacement of the engine 101. The supported catalyst volume is the volume of the support, which includes voids within the support and the volume occupied by the adsorbent and catalyst. Preferably, the total supported catalyst volume of the LNT 104 is no greater than about two times the maximum displacement of the engine 101. An LNT can comprise any suitable NOx-adsorbing material. Examples of NOx adsorbing materials include oxides, carbonates, and hydroxides of alkaline earth metals such as Mg, Ca, Sr, and Ba or alkali metals such as K or Cs.

An ammonia SCR catalyst is commonly configured downstream from the LNT 104. An ammonia SCR catalyst is a catalyst functional to catalyze reactions between NOx and $NH_3$ to reduce NOx to $N_2$ in lean exhaust. Examples of ammonia SCR catalysts include certain oxides of metals such as Cu, Zn, V, Cr, Al, Ti, Mn, Co, Fe, Ni, Mo, W, and Ce, and certain zeolites, for example five or six-member ring zeolites, such as ZSM-5 ZSM-11, and Mordenite, exchanged with metal ions such as cations of Fe, Cu, Co, Ag, or Zn. Preferably, an ammonia-SCR catalyst is designed to tolerate temperatures required to desulfate the LNT 104. Ammonia SCR catalysts are generally susceptible to hydrocarbon poisoning and the methods used herein to prevent NOx slip from the LNT 104 are also useful in preventing hydrocarbon poisoning of a downstream SCR catalyst.

Figure 3:
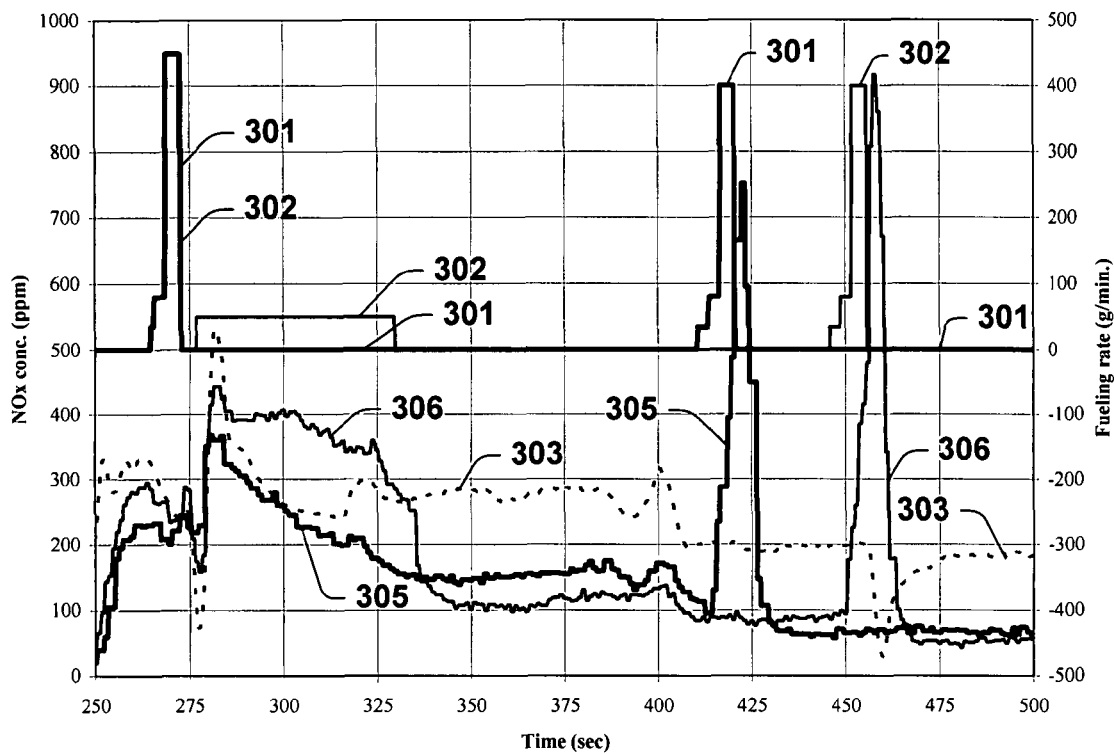
FIG. 3 is a plot showing LNT fueling rates, NOx concentrations entering an LNT, and NOx concentrations exiting an LNT for two test cases.
Figure 4:
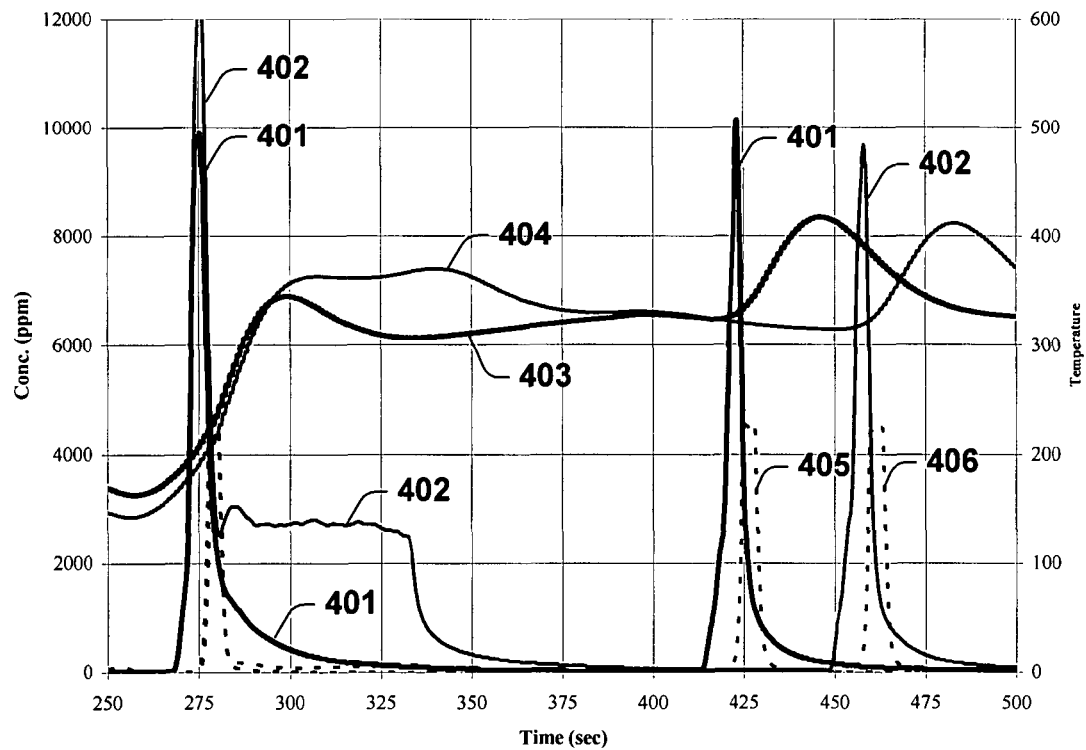
FIG. 4 is a plot showing LNT temperatures, HC concentrations entering the LNT, and CO concentrations entering the LNT for the two test cases of FIG. 3.

FIGS. 3 and 4 provide plots of data from two runs on a test apparatus having exhaust after treatment devices as illustrated in FIG. 2. The test runs related to a startup period in which the exhaust after treatment devices were warming. The inlet NOx concentrations to the LNT 106 from one of the runs is plotted by line 303. The inlet NOx concentrations were essentially the same for both runs. The runs differ in the fueling injection profiles, plotted by lines 301 and 302. In the base case corresponding to line 301, fuel was injected to warm-up the fuel reformer 104 under lean conditions and then injected at an increased provide syn gas to regenerate the LNT 106 in a rich phase twice within the plotted period, first beginning at about 265 seconds and second beginning at about 410 seconds. In the comparison case plotted by line 302, fuel was also injected to provide two fuel reformer warm-up/rich regeneration phases. In addition, the comparison case included a period, beginning at about 280 seconds, over which hydrocarbons were injected at a rate leaving the exhaust lean in order to warm the LNT 106. Some hydrocarbon slip from the fuel reformer 104 occurred during this period.

NOx release rates from the LNT 106 are plotted by lines 305 and 306. Line 305 corresponds to the base case and line 306 corresponds to the comparison case. In each case, there is a NOx release spike associated with the second lean warm-up/rich regeneration phase. Much less NOx is released by the first regeneration. This is due to the temperature of the LNT 106, which is plotted by line 403 for the base case and line 404 for the comparison case. The LNT 106 is at about 200° C. for the first regeneration in each case and undergoes little or no regeneration.

A significant feature of these plots is that NOx is released by the LNT 106 in the comparison case during the lean warm-up phase from about 280 and to about 335 seconds into the experiment as shown by line 306, but not in the base case as shown by line 305. The hydrocarbons reaching the LNT 106 in the comparison case are plotted by line 402. About 3000 ppm hydrocarbon reaches the LNT 106 in the comparison case over this period. The hydrocarbons reaching the LNT 106 in the base case are plotted by line 401. Relatively little hydrocarbon reaches the LNT 106 over this period in the base case. There is little difference between the temperature of the LNT 106 over this period in the comparison case as compared to the base case. Accordingly, the NOx release correlates with the hydrocarbon slip, but not with the LNT temperature.

NOx release from the LNT 106 is also evident during the regeneration phases. During the early parts of the regenerations when HC slip from the fuel reformer 104 is high, NOx slip from the LNT 106 is also high, provided the LNT 106 is above some minimum temperature. As CO production become significant, NOx slip decreases. CO concentrations entering the LNT 106 are plotted by line 405 for the base case and line 406 for the comparison case. The onset of CO production is nearly coincident with the end of HC slip and the end of NOx slip in each case.

There is some offset in the times for the data plotted in FIGS. 3 and 4 due to the different ways each type of data is obtained. In particular, the fuel injection rate data had little offset from real time, but the concentration measurements had a few seconds offset due to the delays inherent in the sensor readings. These delays were not of sufficient magnitude to alter the conclusions discussed above.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
   operating a diesel engine to produce exhaust comprising $NO_x$;
   passing at least a portion of the exhaust from the engine to a lean $NO_x$ trap through a fuel reformer;
   adsorbing $NO_x$ from the exhaust under lean conditions using the lean $NO_x$ trap;
   preparing to regenerate the lean $NO_x$ trap by heating the fuel reformer by at least 100° C. to a temperature of at least about 500° C. by injecting fuel at rates that leave the exhaust entering the fuel reformer lean, while at times limiting the fuel injection rates to limit the amount of $NO_x$ that slips from the lean $NO_x$ trap; and
   wherein limiting the fuel injection rates to limit the amount of $NO_x$ that slips from the lean $NO_x$ trap comprises either:
      (a) setting the fuel injection rate to an upper limit determined by a relationship between fuel injection rate and hydrocarbon slip from the fuel reformer or $NO_x$ slip from the lean $NO_x$ trap; or
      (b) adjusting the fuel injection rate based on measurements of hydrocarbon slip from the fuel reformer or $NO_x$ slip from the lean $NO_x$ trap.

2. The method of claim 1, wherein so limiting the fuel injection rate limits the reformer heating rate to about 50° C. per second or less.

3. The method of claim 1, wherein so limiting the fuel injection rate limits the reformer heating rate to about 20° C. per second or less.

4. The method of claim 1, wherein so limiting the fuel injection rates comprises setting the fuel injection rate to an upper limit determined by a relationship between fuel injection rate and hydrocarbon slip from the fuel reformer or $NO_x$ slip from the lean $NO_x$ trap.

5. The method of claim 1, wherein so limiting the fuel injection rates comprises adjusting the fuel injection rate based on measurements of hydrocarbon slip from the fuel reformer or $NO_x$ slip from the lean $NO_x$ trap.

6. The method of claim 1, wherein the fuel injection rate limits increase based on increasing lean $NO_x$ trap temperature.

7. The method of claim 1, further comprising, while heating the fuel reformer, adsorbing hydrocarbons slipping from the fuel reformer using a hydrocarbon absorber positioned upstream from the lean $NO_x$ trap.

8. The method of claim 1, further comprising passing the exhaust from the lean $NO_x$ trap to a ammonia-selective catalytic reduction catalyst.

9. A method of operating a power generation system, comprising:
   operating a diesel engine to produce exhaust comprising $NO_x$;
   passing at least a portion of the exhaust from the engine to a lean $NO_x$ trap through a fuel reformer;
   using the lean $NO_x$ trap, adsorbing NOx from the exhaust under lean conditions; and
   injecting fuel at rates that leave the exhaust entering the fuel reformer rich, whereby the fuel reformer produces syn gas that regenerates the lean $NO_x$ trap, wherein the fuel injection rates are at times limited to limit the amount of $NO_x$ that slips from the lean $NO_x$ trap;
   wherein limiting the fuel injection rates to limit the amount of $NO_x$ that slips from the lean $NO_x$ trap comprises either:
      (a) setting the fuel injection rate to an upper limit determined by a relationship between fuel injection rate and hydrocarbon slip from the fuel reformer or $NO_x$ slip from the lean $NO_x$ trap; or
      (b) adjusting the fuel injection rate based on measurements of hydrocarbon slip from the fuel reformer or $NO_x$ slip from the lean $NO_x$ trap.

10. The method of claim 9, further comprising preparing to regenerate the lean NOx trap by heating the fuel reformer by at least 100° C. to a temperature of at least about 500° C. by injecting fuel at rates that leave the exhaust entering the fuel reformer lean.

11. The method of claim 9, wherein so limiting the fuel injection rates comprises setting the fuel injection rate to an upper limit determined by a relationship between fuel injection rate and hydrocarbon slip from the fuel reformer or $NO_x$ slip from the lean $NO_x$ trap.

12. The method of claim 9, wherein so limiting the fuel injection rates comprises adjusting the fuel injection rate based on measurements of hydrocarbon slip from the fuel reformer or $NO_x$ slip from the lean $NO_x$ trap.

13. The method of claim 9, wherein the fuel injection rate limits increase based on increasing lean $NO_x$ trap temperature.

14. The method of claim 9, further comprising, while regenerating the lean NOx trap, adsorbing hydrocarbons slipping from the fuel reformer using a hydrocarbon absorber positioned upstream from the lean $NO_x$ trap.

15. The method of claim 9, further comprising passing the exhaust from the lean NOx trap to a ammonia-selective catalytic reduction catalyst.

\* \* \* \* \*